US011131538B2

(12) United States Patent
Shah et al.

(10) Patent No.: US 11,131,538 B2
(45) Date of Patent: Sep. 28, 2021

(54) DETERMINING AZIMUTH OF AN ANTENNA BASED ON IDENTIFICATION OF AN AZIMUTH ERROR

(71) Applicant: Reliance Jio Infocomm Limited, Maharashtra (IN)

(72) Inventors: Brijesh I. Shah, Maharashtra (IN); Vijay Verma, Maharashtra (IN); Vinod Kumar Singh, Maharashtra (IN); Manish Kumar Patel, Maharashtra (IN); Mayank Taran, Maharashtra (IN); Rahul Bhasker P K, Maharashtra (IN); Nitesh Chourasia, Maharashtra (IN); Gaurav Dalwadi, Maharashtra (IN)

(73) Assignee: RELIANCE JIO INFOCOMM LIMITED, Maharashtra (IN)

( * ) Notice: Subject to any disclaimer, the term of this patent is extended or adjusted under 35 U.S.C. 154(b) by 231 days.

(21) Appl. No.: 16/543,981

(22) Filed: Aug. 19, 2019

(65) Prior Publication Data
US 2020/0056876 A1    Feb. 20, 2020

(30) Foreign Application Priority Data
Aug. 20, 2018    (IN) .............................. 201821031150

(51) Int. Cl.
*G01B 7/30* (2006.01)
*G01S 19/39* (2010.01)
*H01Q 1/24* (2006.01)

(52) U.S. Cl.
CPC ............... *G01B 7/30* (2013.01); *G01S 19/39* (2013.01); *H01Q 1/246* (2013.01)

(58) Field of Classification Search
CPC ...................................................... G01B 7/30
See application file for complete search history.

(56) References Cited

U.S. PATENT DOCUMENTS 7,242,964 B1 * 7/2007 Aiken ................. H04B 7/0408
455/105

* cited by examiner

*Primary Examiner* — Keith Ferguson
(74) *Attorney, Agent, or Firm* — Hunton Andrews Kurth LLP

(57) ABSTRACT

The present disclosure relates to identifying azimuth error and determining an azimuth of an antenna installed in a cell of a cellular network. In a preferred embodiment, the network entity receives a plurality of transmission parameters basis to which the network entity identifies a target cell. The network entity further divides angular region of the cell serving the target cell into a plurality of cones out of which a target cone is identified by the network entity. The network entity then performs first iteration yielding a first azimuth, and in an event of an azimuth error in the first azimuth, the network entity performs second iteration yielding a second azimuth. The present disclosure also encompasses predicting an optimum azimuth of said antenna in an event of azimuth error/s in the first azimuth and the second azimuth.

17 Claims, 7 Drawing Sheets

DETERMINING AZIMUTH OF AN ANTENNA BASED ON IDENTIFICATION OF AN AZIMUTH ERROR

CROSS REFERENCE TO RELATED APPLICATIONS

This application claims priority to Indian Patent Application No. 201821031150, filed Aug. 20, 2018, the disclosure of which is hereby incorporated by reference in its entirety.

FIELD OF INVENTION

The present disclosure generally relates to wireless networks and more specifically, directed to a system and a method for determining an azimuth of an antenna deployed in a cellular network based on identification of an azimuth error.

BACKGROUND

In current scenario of advancements in wireless technology such as GMS, EDGE, HSPA, LTE, wireless networks having multiple access points are extensively deployed to provide communication services such as voice, video, data, advertisement, content, messaging, broadcasts, etc. to multiple users by sharing the available network resources. Evolved Universal Terrestrial Radio Access (E-UTRA), which is a radio access network, is considered as a replacement of UMTS and HSDPA/HSUPA technologies specified in 3GPP releases 5 and beyond. E-UTRA is an air interface of 3GPP's Long Term Evolution (LTE) upgrade path for mobile networks. Also, LTE's E-UTRA is an entirely new air interface system and provides higher data rates, lower latency and is optimized for packet data, unlike HSPA. Similarly, the UMTS (successor to Global System for Mobile Communications (GSM)) supports various air interface standards such as W-CDMA, TD-CDMA and TD-SCDMA, along with enhanced 3G data communications protocols such as High-Speed Packet Access (HSPA) that provide higher data transfer speeds and capacity to associated UMTS networks. However, while providing the higher data transfer speeds and capacity, there are various problems associated with optimization of the cells.

An antenna is a dedicated transducer that converts electronic signals to electromagnetic waves (and vice versa). Typically, the antenna performs two functions (i) intercepting Radio Frequency (RF) energy of an electromagnetic wave and delivering radio frequency (RF) signal to an electronic device, and (ii) radiating an electromagnetic wave from RF field fed from an electronic device during transmission. Thus, a cellular network has multiple antennas installed on cells/sites depending on the technologies/spectrum used. For a service operator, an antenna is crucial element for radio transmission, since the antenna planning for azimuth and tilt is important while deciding Radio Frequency (RF) coverage and RF signal characteristics at the user device (UE). Therefore, in light of such important characteristics/functions of the antenna, it is ensured by the operator to install antennas in the field having the planned value of azimuth and tilt. Also, it is important to constantly maintain accurate values in the databases for further network optimization. Further, the antenna technologies have undergone a vast proliferation such that it is now possible to remotely change the antenna tilt using Remote Electrical Tilt (RET) feature while simultaneously updating the databases. However, there still exists a need to manually adjust antenna azimuth by visiting the field/site and manually enter the values in said databases.

There exist various technologies for overcoming this limitation of handling azimuth measurements at the actual site by a field engineer. In one of the existing technologies, a field engineer measures the azimuth by aligning a magnet compass in the direction of the antenna facing and subsequently records the direction of the magnetic compass needle to record the azimuth. However, such measurements could have parallax errors and also the magnetic compass needle may get deflected due to metal structure nearby antenna, providing inaccurate results (deviation in azimuth value by more than ±20 degree approximately). Thus, there is always an uncertainty of the azimuth value entered in the database. In another existing technology, the azimuth is measured/determined using an Antenna Alignment Tool (AAT). The AAT utilizes differential GPS technology to measure the azimuth and automatically record alignment parameters such as azimuth, latitude, longitude, and height of the antenna above the ground. However, it is noted that such conventional technique of using AAT is complex, since the AAT needs to be physically attached to the antenna for azimuth measurement.

Thus, such conventional techniques of using the magnetic compass and/or AAT are not useful in the scenarios of expanded networks with multiple sites and antennas. It is difficult to ensure that the antennas installed on the sites are as per the planned/desired azimuth value. Also, it is difficult to maintain databases in cases of change in azimuth on the site physically. Thus, for an accurate database, it is important for an operator to initiate site/field visit on a regular basis which incurs operational expenses. Also, such conventional techniques are unable to detect any error in azimuth.

Accordingly, in order to overcome the aforementioned problems inherent in the existing/outgoing solutions, there exists a need of an efficient mechanism for identifying azimuth errors and correctly determining azimuth of an antenna without visiting sites/fields based on said identified error and multiple parameters such as SINR and RSRP. Also, there exists a need to accurately predict an optimum/desired value of the antenna azimuth based on the previous azimuth values and azimuth errors.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for determining an azimuth of an antenna serving at least one cell in a cellular network based on identification of an azimuth error. The method being performed by a network entity and the method comprising: receiving a plurality of transmission parameters from plurality of user devices present in each cell of the cellular network and identifying a target cell from the at least one cell based on said transmission parameters, wherein said transmission parameters comprise RSRP and SNR; dividing a target cell into a plurality of cones with each cone having angular width equal to the antenna beam-width; identifying a target cone from the plurality of cones based on number of said user devices being served in the plurality of cones; and determining the azimuth of the antenna, for at least once and up to two iterations, and comparing said azimuth for each iteration with a pre-defined value to identify the azimuth error for each iteration, wherein the first iteration yields a first azimuth and the second iteration yields a second azimuth, the second iteration is performed only in an event the azimuth error is identified in the first iteration, and a weight is applied, upon identification of the azimuth error in the first azimuth, to each of the plurality of cones based on the RSRP and the SNR, in order to determine a weighted centroid of the plurality of the cones.

Further, the embodiments of the present disclosure encompass a network entity for determining an azimuth of an antenna serving at least one cell in a cellular network based on identification of an azimuth error. The network entity comprising: a transceiver configured to receive a plurality of transmission parameters from plurality of user devices present in each cell of the cellular network, wherein said transmission parameters comprise a RSRP, a SNR, a latitude of a location of the plurality of user devices and a longitude of the location of the plurality of user devices; and a processor configured to: identify a target cell from the at least one cell based on said transmission parameters, dividing a target cell into a plurality of cones with each cone having angular width equal to the antenna beamwidth, identify a target cone from the plurality of cones based on number of said user devices being served in the plurality of cones, and determine the azimuth of the antenna, for at least once and up to two iterations, and comparing said azimuth for each iteration with a pre-defined value to identify the azimuth error for each iteration, wherein the first iteration yields a first azimuth and the second iteration yields a second azimuth, the second iteration is performed only in an event the azimuth error is identified in the first iteration, and a weight is applied, upon identification of the azimuth error in the first azimuth, to each of the plurality of cones based on the RSRP and the SNR, in order to determine a weighted centroid of the plurality of the cones.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
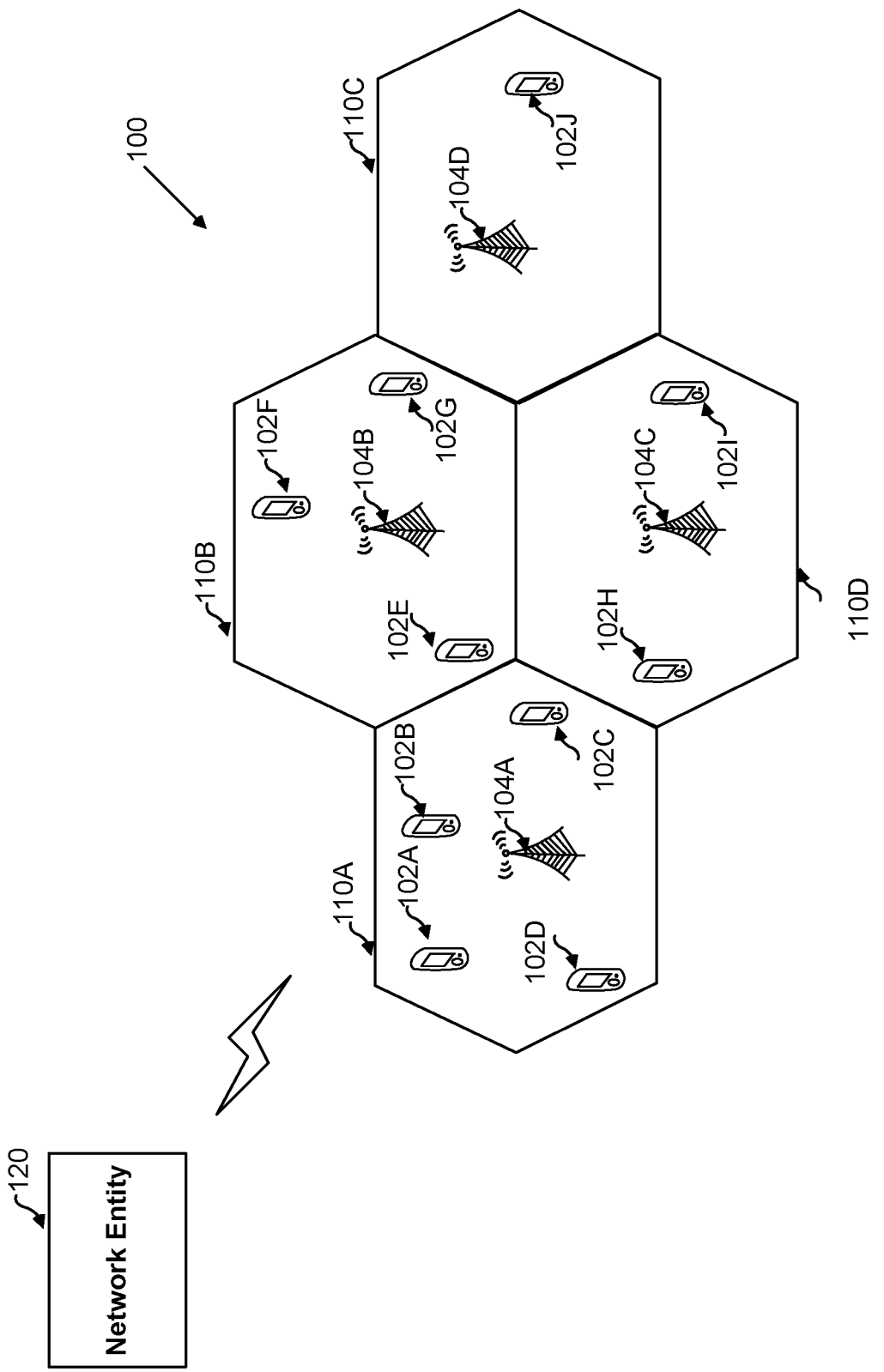
FIG. 1 illustrates an exemplary cellular network [100] distributed over one or more cells [110A, 110B, 110C, 110D] each served by at least one serving cell [104A, 104B, 104C, 104D] for providing services to a plurality of user devices [102A, 102B, 102C, 102D, 102E, 102F, 102G, 104H, 104I, 102J] in a pre-defined azimuth angle, in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a network entity and a method for identifying azimuth error and accurately determining an azimuth of an antenna installed in a cell of a cellular network. The network entity receives a plurality of transmission parameters comprising SNR and RSRP from each user device present in each cell of the network to subsequently identify a target cell based on said SNR and the RSRP. Further, the network entity divides a target cell into a plurality of cones with each cone having angular width equal to the antenna beam-width. Further, the network entity identifies a target cone from the plurality of cones based on number of user devices being served in the plurality of cones. Once the target cone is identified, the network entity determines an azimuth of the antenna serving the target cone for at least once and up to two iterations i.e. first iteration and second iteration. Thereafter, the network entity compares azimuth (first azimuth) for the first iteration with a pre-defined value of azimuth to identify an azimuth error, wherein the first azimuth is based on one of a bi-sector angle and a cone centroid of the target cone. In an event of identification of the azimuth error in the first azimuth, the network entity performs the second iteration of determining the azimuth and again compares second azimuth with the pre-defined value, wherein the second azimuth is based on a weighted centroid. The present disclosure also encompasses predicting an optimum/desired value of the azimuth in an event of identification of the azimuth errors in the second azimuth as well.

As illustrated in FIG. 1, the cellular network [100] as used herein may refer to a mobile network distributed over land areas called cells/sites [110A-110D] each being served by at least one serving cell [104A-104D] for providing services to one or more user devices [102A-102J] present in said network [110]. Further, each cell [110A-110D] is served by an antenna in a pre-defined azimuth angle. The at least one cell [110A-110D] may provide a network coverage to a geographic coverage area. The target cell [for e.g. 110A] as used herein may refer to a cell selected among other cells [110A-110D] based on the transmission parameters. Further, in the cellular network [100], a network entity [120] may be deployed to communicate with said user devices [102A-10J] and the one or more serving cells [104A-104D]. The terms 'cells' and 'sites' may be interchangeably used throughout the specification.

The user device [102A-102J] as used herein may include, but not limited to, a smart phone, a feature phone, a tablet, a phablet and any such device obvious to a person skilled in the art. Further, the user device [102A-102J] may comprise a cellular stack, a cellular radio receiver, a processor and a memory for performing the steps of monitoring various transmission parameters and transmitting them to the network entity, in accordance with the present disclosure. Additionally, the user device [102A-102J] may comprise an input means such as a keyboard, an operating system, a memory unit, a display interface, etc.

The network entity [120] as used herein may refer to one of an eNodeB, a Base Transceiver Station (BTS), a Base Station Controller (BSC), a Radio Network Controller (RNC) and a server. As used herein, the serving base station (macro base station) and the target base station (micro/pico base station) may comprise of multiple cellular and Wi-Fi small cells, either separate or integrated and may be deployed at various hotspot locations under a macro coverage area. Further, the network entity [120] may be present in the cellular network and may comprise of one or more components of an IMS network, wherein said components may include, but not limited to, a transceiver unit and a processor. Furthermore, the network entity [120] may be configured to communicate with the plurality of user devices [102A-102J] through a wireless LAN network. Also, the network entity [120] may be configured to serve the plurality of serving cells [104A-104D] present in the network.

The transceiver unit as used herein may refer to device comprising a transmitter and a receiver configured to transmit and receive data/information.

The processor as used herein may include one or more processors, wherein the processor may refer to any logic circuitry for processing instructions. Said processor may be a general-purpose processor, a special purpose processor, a conventional processor, a digital signal processor (DSP), a plurality of microprocessors, a controller and a microcontroller.

The transmission parameters as used herein may refer to network information/data received by the network entity from each user device [102A-102J] present in each cell [110A-110D] in the cellular network [100]. Further, the transmission parameters may include, but not limited to, a RF coverage power (RSRP), a Signal to Noise ratio (SNR), a bearing angle and a cell identity details (Cell ID) including user device location such as latitude and longitude. In another embodiment, the transmission parameters may include a Signal to Interference Noise Ratio (SINR), RF coverage power (RSRP), latitude and longitude of user device.

The azimuth as used herein may refer to a rotation of the antenna around a vertical axis. The azimuth angle as used herein may refer to a compass direction with respect to the true North. Further, the type of antenna as used herein may be directional type or omni-directional type (comprising of an array of radiating elements—dipoles).

The beam width of the antenna as used herein may refer to a half power beam width (HPBW) which is the angle between the half-power points of the main lobe, when referenced to the peak effective radiated power of the main lobe. Further, the present disclosure encompasses dividing entire 360-degree angular span into a plurality of cones with each cone have an angular width same as the beam-width of cell antenna.

Figure 2:
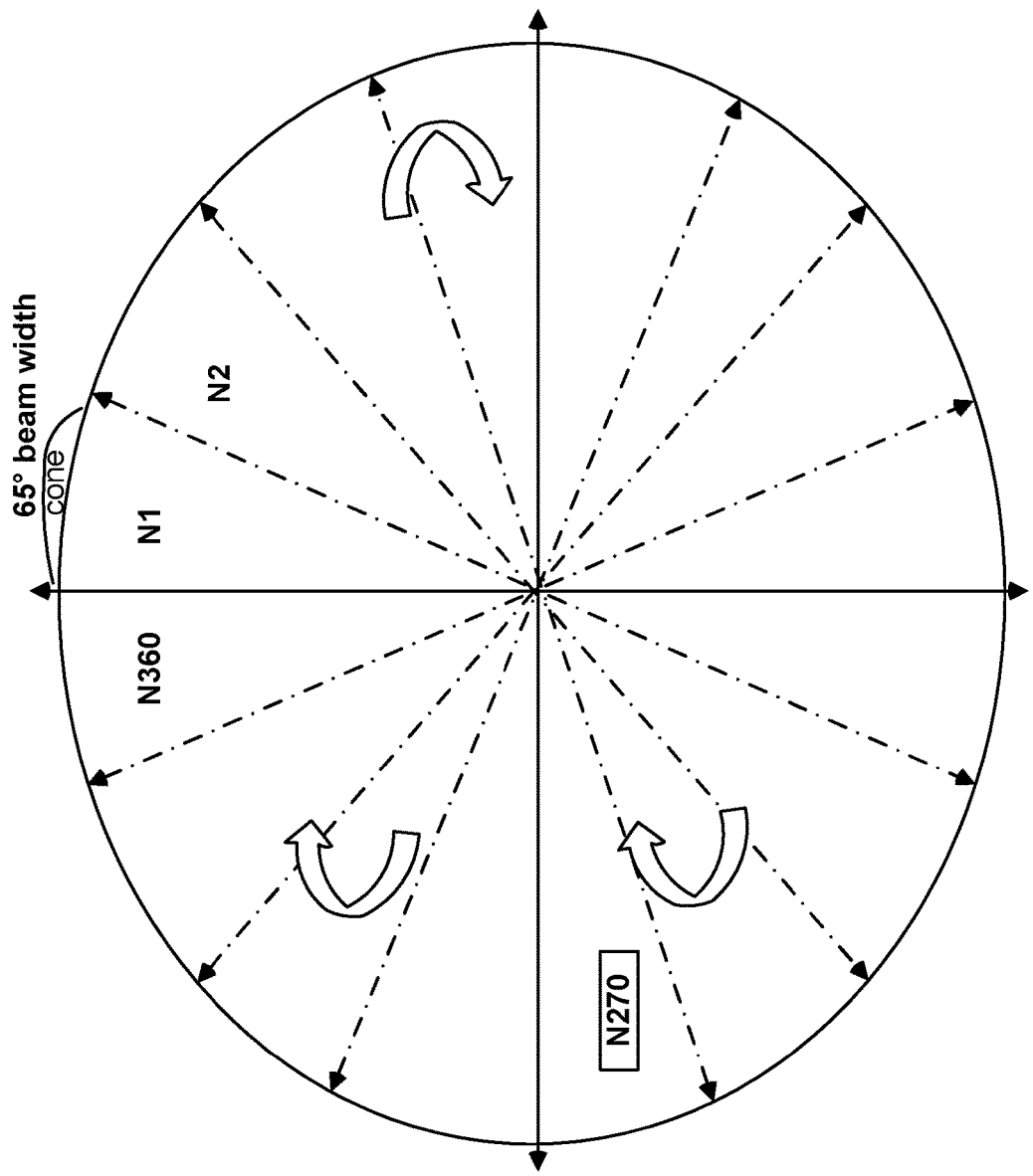
FIG. 2 illustrates dividing a target cell into a plurality of cones (N1, N2, . . . N360) with each cone having angular width equal to the antenna beam-width, in accordance with an embodiment of the present disclosure.
Figure 2:
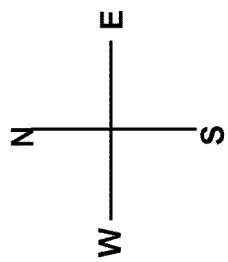

FIG. 2 illustrates dividing a target cell into a plurality of cones with each cone have an angular width same as the Beam-width of cell antenna in accordance with an embodiment of the present disclosure. Said target cell is divided into the plurality of cones (N1, N2, - - - , N360) by rotating/moving the cone in 1 degree step for entire 360 degree with respect to true north of said serving cell, wherein said cones may refer to conical portions/areas of target cell The cone centroid as used herein may refer to an average position of all the points of an object i.e. cone in this case. In particular, the cone centroid may refer to that specific point in the cone where the medians intersect in the cone, wherein the median is a line segment joining a vertex to the midpoint of the opposite side, thus bisecting that side.

The bi-sector angle of the cone may refer to an internal angle bisector which is a line or a line segment that divides the angle into two equal parts.

The iterations (first iteration and second iteration) as used herein may refer number of times the process of determining the azimuth is performed. In particular, the present disclosure encompasses at most two iterations (first iteration and second iteration) for determining azimuth of the antenna and further checking if any azimuth error is detected. The first iteration yields a first azimuth while the second iteration yields a second azimuth. Further, the second iteration is performed only when an azimuth error is identified in the first iteration.

The following table (Table 1) illustrates the definitions of various parameters such as network parameters, antenna parameters in accordance with wireless communication networks based on the 3GPP, IEEE 802.16 and IEEE 802.11 standards:

TABLE 1

| Parameters | Full Form | Definition |
|---|---|---|
| RSRP | RF coverage power | It refers to a power of the LTE reference signals spread over the full bandwidth and narrow band. |
| SNR | Signal to Noise Ratio | It refers to a ratio of signal power to the noise power. |
| Bearing Angle | N.A. | Bearing angle of all the user devices may be determined with respect to north of the serving cell using the following formula:<br>Bearing angle = [180/PI( )] * {2 * PI( ) − ACOS{{SIN[lat2 * PI( )/180] − SIN[lat1 * PI( )/180] * COS(Variable)}/{SIN(variable) * COS[lat1 * PI( )/180]}}}, if {SIN[(long2 − long1) * PI( )/180] < 0,<br>Or<br>Bearing angle = [180/PI( )] * {ACOS{{SIN[lat2 * PI( )/180] − SIN[lat1 * PI( )/180] * COS(Variable)}/{SIN(Variable) * COS[lat1 * PI( )/180]}}}, if {SIN[(long2 − long1) * PI( )/180] > 0 |
| Variable used in the | N.A. | It may be determined using the following formula: |

TABLE 1-continued

| Parameters | Full Form | Definition |
|---|---|---|
| bearing angle formula | | Variable = ACOS{SIN[lat1 * PI( )/180] * SIN[lat2 * PI( )/180] + COS[lat1 * PI( )/180] * COS[lat2 * PI( )/180] * COS[lon2 * PI( )/180 − lon1 * PI( )/180]} lat1: Latitude of Site 1 (eNodeB) lat2: Latitude of Site 2 (UE sample) long1: Longitude of Site 1 (eNodeB) long2: Longitude of Site 2 (UE sample) |
| Cell identity details | Cell ID details | Cell ID details comprises location of the user device i.e. latitude and longitude detail and refers to a unique number used to identify the serving cell in a network |
| SINR | Signal to Noise Interference Ratio | It refers to a measure of signal quality and is defined as a ratio of signal power to the sum of interference and noise-power. It indicates how much desired signal is stronger as compared to noise and interference. |
| User location | Latitude and Longitude | Both are used to locate or identify geographical position of any object or user |
| Target Cell | Target Cell | Target cell is referred to as the cell for which azimuth is estimated |
| QOS | Quality of Service | It refers to a description or measurement of an overall performance experienced by the users of the network. Also, it refers to any technology managing data traffic to reduce packet loss, latency and jitter on the network. |

Figure 3:
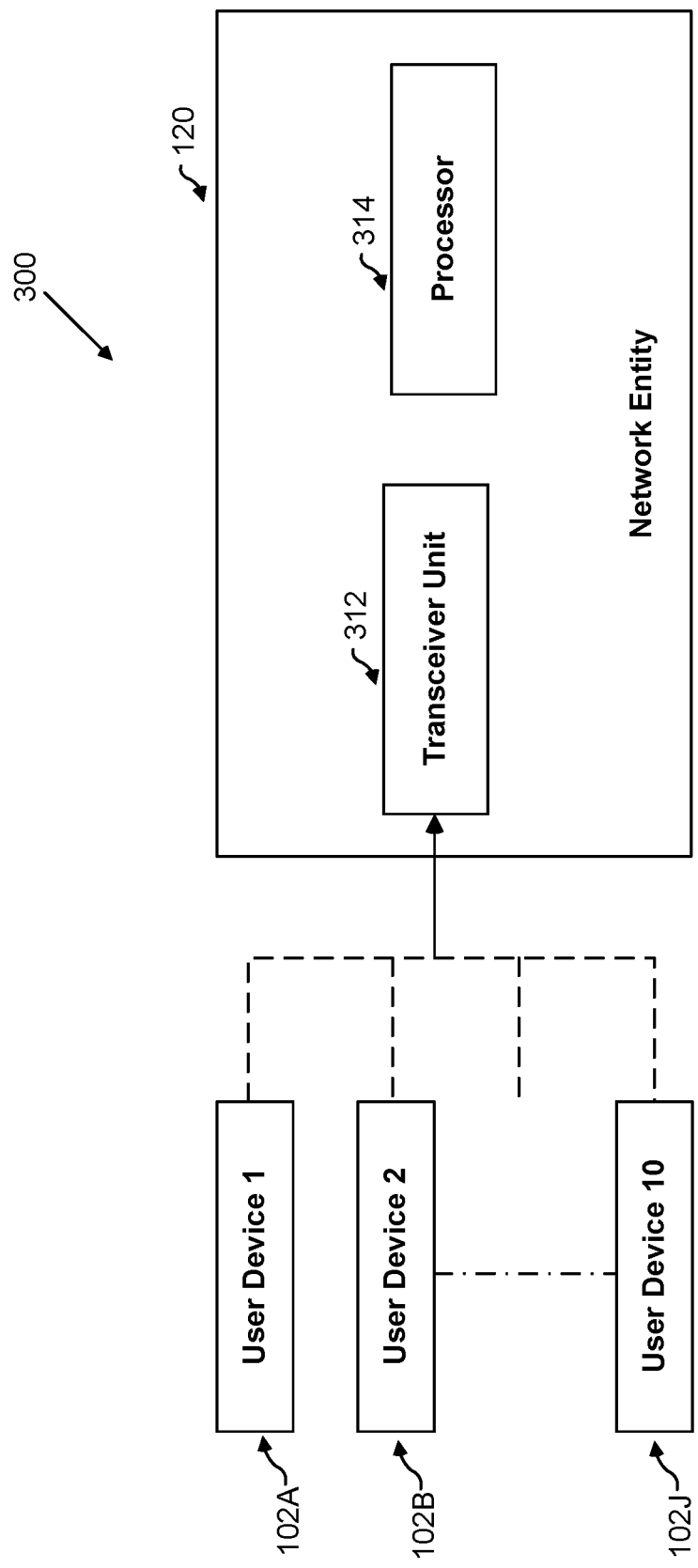
FIG. 3 illustrates a system architecture [300] for determining an azimuth of an antenna serving at least one cell in a cellular network [100] based on identification of an azimuth error, in accordance with an embodiment of the present disclosure.

FIG. 3 illustrates a system architecture [300] for determining an azimuth of an antenna serving at least one cell [110A-110D] in the cellular network [100] based on identification of an azimuth error, in accordance with an embodiment of the present disclosure. As illustrated in the FIG. 3, the system architecture [300] may comprise a plurality of user devices [102A-102J] and a network entity [120] in the cellular network [100]. The network entity [120] may further comprise a transceiver [312] and a processor [314]. Further, the transceiver [312], the processor unit [314] and the sub-components therein may be configured to work in conjunction and provide respective functionalities in order to achieve the objective of the present disclosure.

The transceiver [312] may be configured to receive a plurality of transmission parameters from plurality of user devices [102A-102J] present in each cell [110A-110D] of the cellular network [100]. In an embodiment, said transmission parameters may include, but not limited to, RF coverage power (RSRP), Signal to Noise ratio (SNR), bearing angle, cell identity details (Cell ID), user location such as latitude and longitude), Signal to Interference Noise Ratio (SINR) and Quality of Service (QOS). Further, the present disclosure encompasses receiving of said transmission parameters in one of a periodic manner and a real time manner at the system [300]. Thereafter, the transceiver [312] may be configured to transmit said transmission parameters to the processor [314] of the network entity [120].

On receiving said transmission parameters, the processor [314] may be configured to analyse said parameters for a target cell [for e.g. 110A] among the plurality of cells [110A-110D] in the network [100] based on the transmission parameters. In a preferred embodiment, the processor [314] may be configured to identify the target cell [for e.g. 110A] based on the RSRP and SNR parameters. In another embodiment, the processor [314] may be configured to identify the target cell [for e.g. 110A] based on dense population, a medium population, urban area and rural area.

Subsequently, the processor [314] may be configured to divide the target cell into a plurality of cones with each cone having angular width equal to the antenna beam-width [for e.g. 110A] wherein said plurality of cones have a pre-determined angular separation with each other. In an embodiment, said angular separation may be kept at 1 degree step or higher. In an embodiment, the processor [314] may be configured to create the plurality of cones with angular width equal to the 3 dB horizontal beam width (HPBW) of the antenna, wherein the beam width of the antenna is 65 degree. In an embodiment and as illustrated in the FIG. 2, the target cell is divided into the plurality of cones by rotating/moving the cone in 1 degree step for entire 360 degree with respect to north of said serving cell [for e.g. 104A].

Further, once the target cell is divided into the plurality of cones, the processor [314] may be configured to identify a target cone from said plurality of cones based on number of said user devices [102A-102J] being served in the plurality of cones. In an embodiment, the target cone may be identified based on a pre-defined number of the user devices [102A-102J] served in the plurality of cones, wherein said pre-defined number may be defined by one of the system [300] and the users. For instance, the system [300] may define the number of user device to be 60 percent i.e. the cone having user devices more than percent of the total user devices in the target cell [100] may be identified as the target cone.

In an event the target cone [for e.g. 110A] having user devices more than the pre-defined number is identified, the processor [314] may be configured to determine the azimuth of the antenna for at least once and up to twice. Thus, the processor [314] may be configured to perform the first iteration and subsequently perform the second iteration only if the first iteration is not successful. The first azimuth may be determined based on a bi-sector angle of the target cone. In an event the target cone is not identified, the processor [314] may be configured to increase the angular width of the cone in 1 degree until the target cone is identified. Thereafter, the processor [314] may be configured to determine the first azimuth based on the cone centroid being determined by the processor [314]. In an example, the processor [314] for determining the cone centroid, may be configured to perform few steps comprising (i) converting all the bearing angles (in degree) in to radians; (ii) determining sin and cos values of said radians; (iii) finding sum of all the sin and cos values; (iv) determining centroid angle via an equation centroid angle=A TAN 2 (cos values+sin values), wherein the centroid angle is determined in degree; and (v) in an event the centroid is negative, the centroid may be re-determined via equation: centroid angle+360.

On determining the first azimuth based on one of the bi-sector angle and the cone centroid, the processor [314] may be configured to compare said first azimuth with a pre-defined value of azimuth (i.e. difference between said first azimuth and the pre-defined value of azimuth), wherein said pre-defined value may be defined by one of the system [300] and the users based on the transmission parameters and the type of antenna. In an embodiment, said pre-defined value of azimuth may be defined as the difference±10 degree. Based on said comparison, the processor [314] may be configured to check whether or not the azimuth error is identified i.e. if the first azimuth matches with the pre-defined value, no azimuth error is identified while in another instance if the first azimuth does not match with the pre-defined value, the azimuth error is identified, thereby indicating that the first azimuth of the antenna (determined in the first iteration) is not the optimum value required by the system [300] and the users for smoothly providing services to the users.

In an event the azimuth error is identified in the first iteration (first azimuth), the processor [314] may be configured to perform second iteration of determining the second azimuth. Thus, the second iteration is performed only when the azimuth error is identified in the first azimuth. In the second iteration, the processor [314] may be configured to apply a weight to each of the said plurality of cones based on said transmission parameters to determine a weighted centroid. In an embodiment, the weight may be applied based on the RSRP and the SNR. In yet another embodiment, a weighted average of RSRP and number of said user devices present in the plurality of cones may be applied to each of the plurality of cones. For example, the weighted average of 80 percent for RSRP and 20 percent for said number of user devices is applied. The processor [314] may be then configured to prioritize the weighted cones (i.e. the cones being applied with the weight) based on the weighted average and subsequently, based on said prioritization, the processor [314] may be configured to determine the weighted centroid of the weighted cones. For instance, the processor [314] may be configured to identify top 100 weighted cones and then determine weighted centroid of said 100 weighted cones. Pursuant to determining of the weighted centroid, the processor [314] may be configured to determine the second azimuth based on said weighted centroid. In an embodiment, the weighted centroid may be considered as the second azimuth.

Further, on determining the second azimuth based on the weighted centroid, the processor [314] may be configured to compare said second azimuth with said pre-defined value of azimuth to check whether or not the azimuth error is identified in the second azimuth i.e. if the second azimuth matches with the pre-defined value, no azimuth error is identified while in another instance if the second azimuth does not match with the pre-defined value, the azimuth error is identified, thereby indicating that the second azimuth of the antenna (determined in the second iteration) is not the optimum value required by the system [300] and the users for smoothly providing services to the users.

Further, the azimuth error is not identified in the first iteration or the second iteration in an event the user devices are present in the line of sight of the antenna such that the main lobe of antenna does not have any obstructions from nearby buildings. However, the azimuth error may be identified in the first iteration as well as the second iteration in an event of obstructions in the main lobes of the antenna due to buildings. Also, said azimuth error may be identified in an event of strong reflections from said user devices outside the main lobe.

In an event the azimuth error is identified in the first iteration (first azimuth) as well as the second iteration (second azimuth), the processor [314] may be configured to predict an optimum (desired) value of the azimuth. The processor [314] may be configured to generate a predicted value of the RSRP and the SNR for each of the plurality of cones in the target cell. In an embodiment, the processor [314] may be configured to predict the RSRP and SNR values in a RF planning tool using a ray tracing based 2D/3D propagation model, wherein the ray tracing considers reflection, refraction and diffraction occurred due to obstructions present and therefore, predicts the RSRP and SNR values according to the user devices present outside the main lobe of the antenna. In another embodiment, the RSRP and the SNR may be predicted in each 1-degree step from 0 degree to 360 degree in the plurality of cones. Further, the processor [314] may be configured to determine a co-relation and a mean error between said predicted RSRP and SNR values and a current value of the RSRP and the SNR received from the plurality of user devices [102A-102J]. On determining the co-relation and the mean error, the processor [314] may be configured to determine a normalized value of said co-relation and the mean error. Further, the processor [314] may be configured to apply a weighted average to each of the plurality of cones and finally predict the optimized value of the azimuth based on the cone having the maximum weighted average. The present disclosure further encompasses comparing the predicted azimuth with said pre-defined value of the azimuth and further notifying said predicted azimuth to the network operators in both the events when the predicted azimuth matches with the pre-defined value or doesn't match with the pre-defined value.

Figure 4:
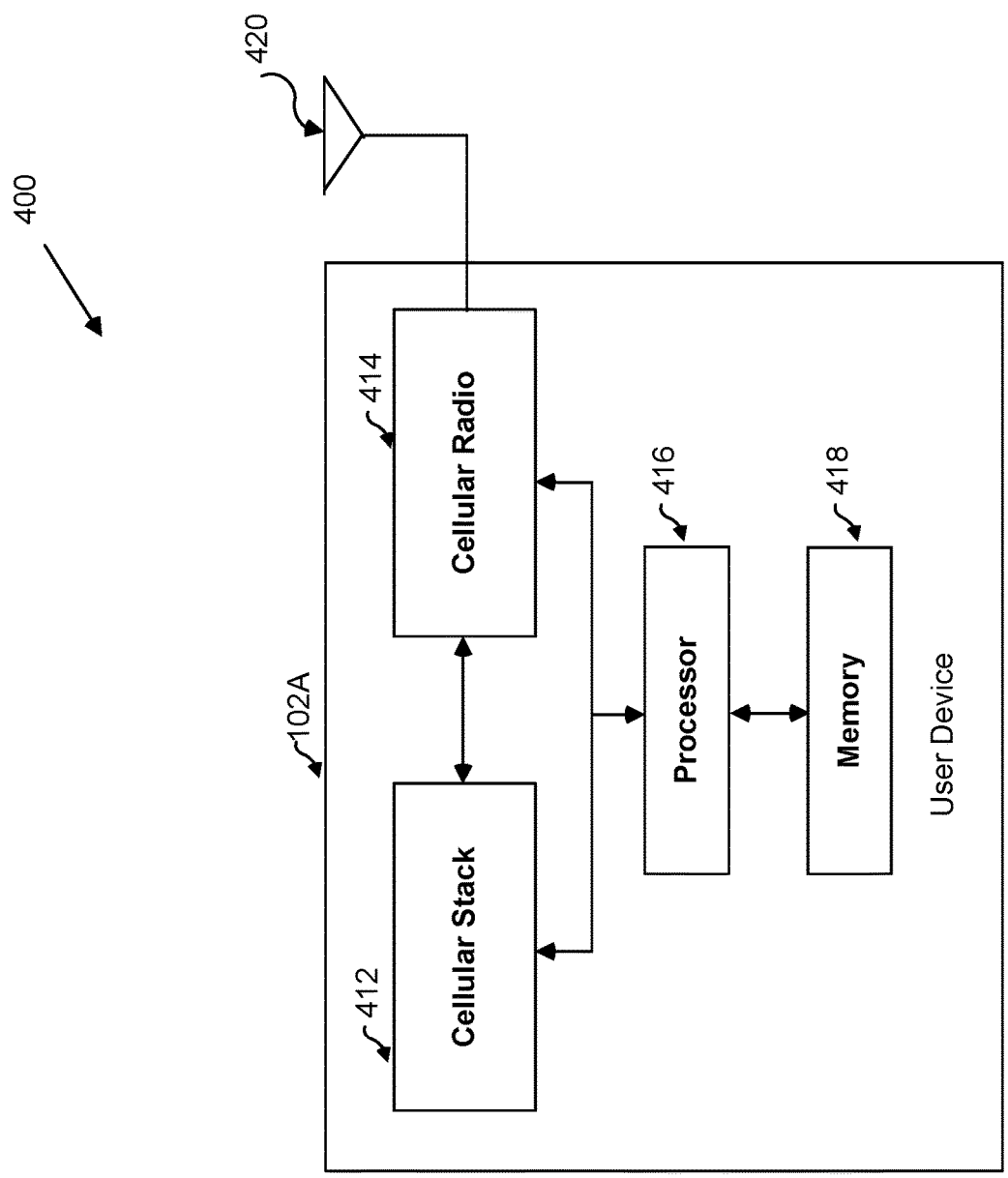
FIG. 4 illustrates a system architecture of an exemplary user device [for e.g. 102A] deployed in the cellular network [100] for transmitting a plurality of transmission parameters to a network entity [120], in accordance with an embodiment of the present disclosure.

Further, the embodiments of the present disclosure encompass the user device [102A-102J] for communicating with the network entity [120] and other components in the cellular network [100]. FIG. 4 illustrates the system architecture [400] of an exemplary user device [for e.g. 102A] deployed in the cellular network [100] for monitoring the plurality of transmission parameters and transmitting them to the network entity [120]. The user device [for e.g. 102A] may comprise a cellular stack [412], a cellular radio [414], a processor [416] and a memory [418], wherein the cellular radio may be connected with the antenna [for e.g. 420] present in the cellular network [100]. The present disclosure may encompass passive monitoring of the plurality of transmission parameters by the processor [416] of the user device [for e.g. 102A]. In an embodiment, said processor [416] may categorize the transmission parameters based on urban and rural areas. Further, the cellular stack [412] and the cellular radio [414] may be configured to transmit the plurality of transmission parameters to the transceiver [312] of the network entity [120] in one of the periodic manner and the real time manner. Further, the memory [418] of the user device [for e.g. 102A] may be configured to store said transmission parameters. In an embodiment, the memory may be a volatile memory or a non-volatile memory, wherein said memory may be single or multiple, coupled or independent, and may be positioned at user device level.

Figure 5A:
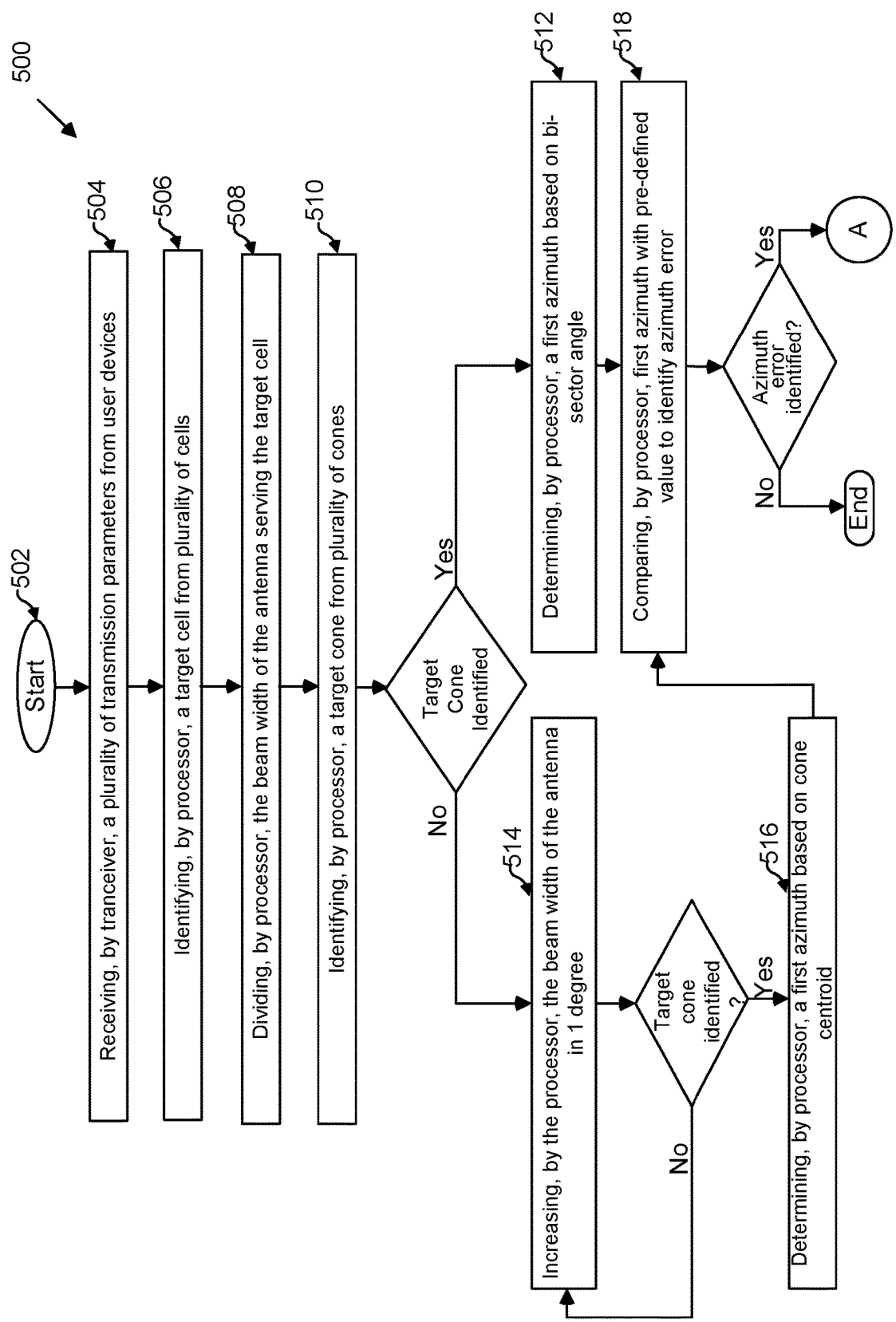
FIG. 5 (FIG. 5A and FIG. 5B) illustrates an exemplary method flow diagram [500] comprising the method [500] for determining an azimuth of an antenna serving at least one cell [for e.g. 110A] in a cellular network [100], in accordance with an embodiment of the present disclosure.
Figure 5B:
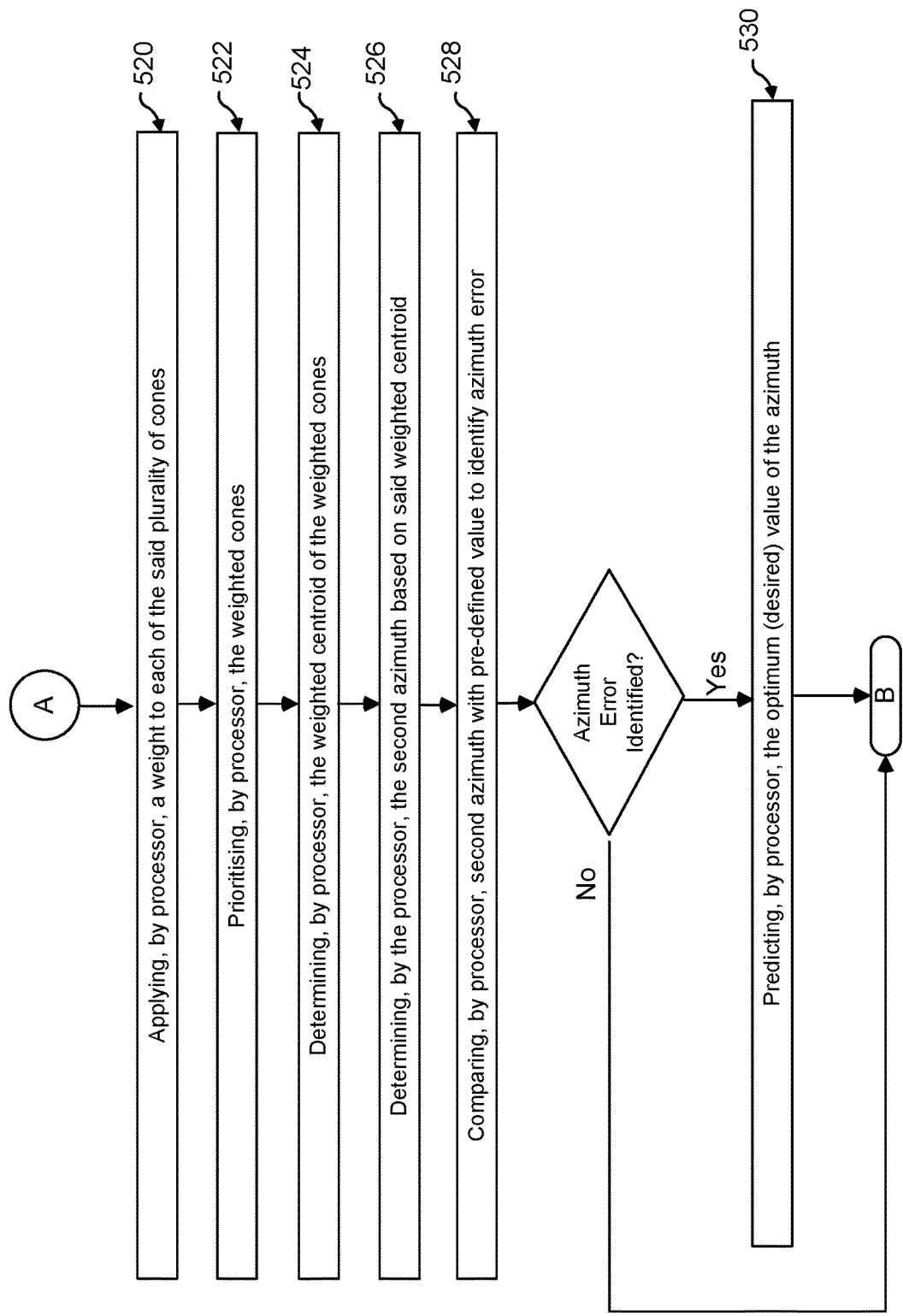

As illustrated in FIG. 5 (FIG. 5A and FIG. 5B), the present disclosure encompasses an exemplary method [500] for determining an azimuth of an antenna serving at least one cell [110A-110D] in the cellular network [100], in accordance with an embodiment of the present disclosure. The following method [500] may be implemented at the network entity [120]. Said method [500] includes detailed steps for determining the azimuth based on the identified azimuth error, wherein the method [500] may initiate at step 502.

At step 504, the transceiver [312] of the network entity [120] may receive a plurality of transmission parameters from the plurality of user devices [102A-102J] present in each cell [110A-110D] of the cellular network [100]. The present disclosure encompasses receiving of said transmission parameters in one of a periodic manner and a real time manner. Thereafter, the transceiver [312] may transmit said transmission parameters to the processor [314] of the network entity [120].

At step 506, the processor [314] may analyze said parameters and identify a target cell [for e.g. 110A] among the plurality of cells [110A-110D] in the cellular network [100] based on the transmission parameters. In a preferred embodiment, the processor [314] may be configured to identify the target cell [for e.g. 110A] based on the RSRP and SNR parameters. In another embodiment, the processor [314] may be configured to identify the target cell [for e.g. 110A] based on dense population, a medium population, urban area and rural area.

At step 508, the processor [314] may identify the target (serving) cell [for e.g. 110A] and the corresponding serving cell [for e.g. 104A] angular region into a plurality of cones, wherein said plurality of cones have the pre-determined angular separation with each other. In an embodiment, the processor [314] may be configured to create the angular width for the plurality of cones based on a 3 dB horizontal beam width (HPBW) of the antenna, wherein the beam width of the antenna is 65 degree.

At step 510, once the angular width of the target cell is divided into the plurality of cones, the processor [314] may identify the target cone from said plurality of cones based on number of said user devices [102A-102J] being served in the plurality of cones. In an embodiment, the target cone may be identified based on a pre-defined number of said user devices [102A-102J] served in the plurality of cones. In an event the target cone is identified, the method [500] may lead to step 512, whereas in the event the target cone is not identified, the method [500] may lead to step 514.

At step 512 and pursuant to identification of the target cone, the processor [314] may perform the first iteration and determine the first azimuth based on the bi-sector angle of the target cone.

At step 514, in the event, the target cone is not identified, the processor [314] may increase the beam width of the cone in 1 degree until the target cone is identified. Once the target cone is identified, the method [500] may lead to step 516.

At step 516 and pursuant to identification of the target cone, the processor [314] may perform the first iteration and determine the first azimuth based on the cone centroid of the target cone. In an example, the processor [314] for determining the cone centroid, may be configured to perform few steps comprising (i) converting all the bearing angles (in degree) in to radians; (ii) determining sin and cos values of said radians; (iii) finding sum of all the sin and cos values; (iv) determining centroid angle via an equation centroid angle=A TAN 2 (cos values+sin values), wherein the centroid angle is determined in degree; and (v) in an event the centroid is negative, the centroid may be re-determined via equation: centroid angle+360. Pursuant to determining of the first azimuth during the first iteration at one of the step 512 and the steps 514-516, the method [500] may lead to step 518.

At step 518, the processor [314] may compare said first azimuth with the pre-defined value of azimuth (i.e. difference between said first azimuth and the pre-defined value of azimuth). Based on said comparison, the processor [314] may check whether or not the azimuth error is identified in the first azimuth. In an event the first azimuth matches with the pre-defined value, no azimuth error is identified and the method [500] may terminate. On the contrary, in an event the first azimuth does not match with the pre-defined value, the azimuth error is identified, the method [500] may lead to step 520.

At step 520, in the event the azimuth error is identified in the first iteration (first azimuth), the processor [314] may perform the second iteration of determining the second azimuth. Thus, the second iteration is performed only when the azimuth error is identified in the first azimuth. The processor [314] may apply the weight to each of the said plurality of cones based on said transmission parameters to determine a weighted centroid. In an embodiment, the weight may be applied based on the RSRP and the SNR. In yet another embodiment, a weighted average, of RSRP and number of said user devices [102A-102J] in the plurality of cones, may be applied to each of the plurality of cones.

At step 522, the processor [314] may then prioritize the weighted cones (i.e. the cones being applied with the weight) based on the weighted average.

At step 524, the processor [314] may determine the weighted centroid of the weighted cones. For instance, the processor [314] may be configured to identify top 100 weighted cones and then determine weighted centroid of said 100 weighted cones.

At step 526, the processor [314] may determine the second azimuth based on said weighted centroid. In an embodiment, the weighted centroid may be considered as the second azimuth.

At step 528, the processor may compare said second azimuth with the pre-defined value of azimuth (i.e. difference between said first azimuth and the pre-defined value of azimuth). Based on said comparison, the processor [314] may check whether or not the azimuth error is identified in the second azimuth. In an event the second azimuth matches with the pre-defined value, no azimuth error is identified and the method [500] may terminate. On the contrary, in an event the second azimuth does not match with the pre-defined value, the azimuth error is identified, the method [500] may lead to step 530.

At step 530, in the event the azimuth error is identified in the first iteration (first azimuth) as well as the second iteration (second azimuth), the processor [314] may predict the optimum (desired) value of the azimuth, and further proceeds to step B.

Figure 6:
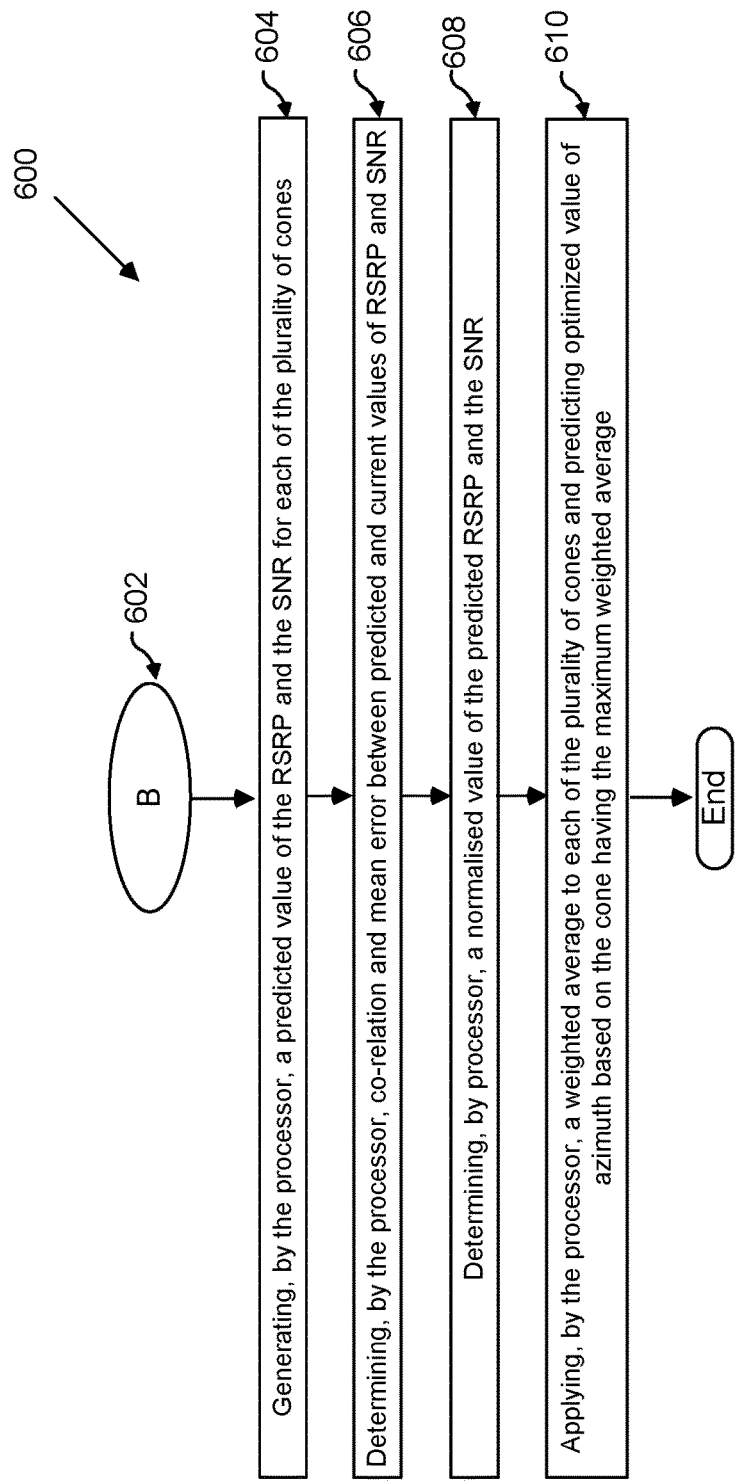
FIG. 6 illustrates an exemplary method flow diagram [600] comprising the method [600] for predicting an optimum azimuth of an antenna serving at least one cell [for e.g. 110A] in a cellular network [100], in accordance with an embodiment of the present disclosure.

Further, FIG. 6 illustrates an exemplary method flow diagram [600] comprising the method for predicting an optimum azimuth of an antenna serving at least one cell [for e.g. 110A] in a cellular network [100], in accordance with an embodiment of the present disclosure. The following method [600] may be implemented at the network entity [120]. Said method includes detailed steps involved in the step 530 of predicting the optimum azimuth in the event of identification of azimuth error in the first iteration (first azimuth) as well as the second iteration (second azimuth, wherein the method [600] may initiate at step B, i.e. step 602.

At step 604, the processor [314] may generate the predicted value of the RSRP and the SNR for each of the plurality of cones created after dividing the angular region of the target cell. In an embodiment, the processor [314] may predict the RSRP and SNR values in a RF planning tool using a ray tracing based 2D/3D propagation model, wherein the ray tracing considers reflection, refraction and diffraction occurred due to obstructions present and therefore, predicts the RSRP and SNR values according to the user devices present outside the main lobe of the antenna. In another embodiment, the RSRP and the SNR may be predicted for each 1-degree step cone from 0 degree to 360 degree in the plurality of cones.

At step 606, the processor [314] may determine a co-relation and a mean error between said predicted RSRP and SNR values and a current value of the RSRP and the SNR received from the plurality of user devices [102A-102J] for each cone.

At step 608, the processor [314] may determine a normalized value of the co-relation and mean error values for each cone.

At step 610, the processor [314] may apply a weighted average to each of the plurality of cones and finally predict the optimized value of the azimuth based on the cone having the maximum weighted average. The present disclosure further encompasses comparing the predicted azimuth with said pre-defined value of the azimuth and further notifying said predicted azimuth to the network operators in both events when the predicted azimuth matches with the pre-defined value or doesn't match with the pre-defined values.

Therefore, the present disclosure encompasses a system [300] and a method [500] for identifying azimuth error's in the azimuth and subsequently determining correct azimuth of the antenna for up to two iterations (first iteration yielding first azimuth and second iteration yielding second azimuth), wherein said second iteration is performed only in case the first iteration is un-successful. The present disclosure also encompasses a method [600] for predicting an optimum azimuth of said antenna in case the previous values (first azimuth and second azimuth) of the azimuth have error.

Though a limited number of the cells/sites [110A-110D], the user devices [102A-102J], the serving cells [104A-104D], the network entity [120], the antennas and the subcomponents therein have been shown in the figures; however, it will be appreciated by those skilled in the art that the system [300] of the present disclosure and the system architecture [400] of the user device [102A-102J] encompasses any number and varied types of the components/modules and other components/sub systems as may be obvious to person skilled in the art.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method for determining an azimuth of an antenna serving at least one cell in a cellular network based on identification of an azimuth error, the method being performed by a network entity, the method comprising:
   receiving a plurality of transmission parameters from a plurality of user devices present in each cell of a cellular network and
   identifying a target cell from at least one cell based on said plurality of transmission parameters;
   dividing a 360-degree angular region of a cell serving the target cell into a plurality of cones and defining an angular width of the plurality of cones based on a type of the antenna;
   identifying a target cone from the plurality of cones based on a number of said user devices being served in the plurality of cones; and
   determining the azimuth of the antenna, for at least once and up to two iterations, and comparing said azimuth for each iteration with a pre-defined value to identify the azimuth error for each iteration, wherein
     a first iteration yields a first azimuth and a second iteration yields a second azimuth,
     the second iteration is performed only in an event the azimuth error is identified in the first iteration, and
   a weight is applied, upon identification of the azimuth error in the first azimuth, to each of the plurality of cones based on a radio frequency (RF) coverage power (RSRP) and a signal to noise ratio (SNR), in order to determine a weighted centroid of the plurality of the cones.

2. The method as claimed in claim 1, wherein said plurality of transmission parameters comprise at least one of the RSRP, the SNR, a bearing angle, a cell identity detail, a latitude of a location of the plurality of user devices and a longitude of the location of the plurality of user devices.

3. The method as claimed in claim 1, further comprising increasing the angular width of the plurality of cones by 1 degree in an event no target cone is identified.

4. The method as claimed in claim 1, further comprising predicting an optimum value of azimuth in an event the azimuth error is identified in the first azimuth and the second azimuth, wherein predicting said optimum value comprising steps of:
   generating a predicted value of the RSRP and the SNR for each of the plurality of cones,
   determining a co-relation and a mean error between said predicted value a current value of the RSRP and SNR received from the plurality of user devices and determining a normalized value of said co-relation and the mean error, and
   applying a normalized weight to each of the plurality of cones and predicting said optimized value of the azimuth based on the cone having maximum normalized weight.

5. The method as claimed in claim 1, wherein the plurality of transmission parameters are received from the plurality of user devices in one of a periodic manner and a real time manner.

6. The method as claimed in claim 1, wherein the plurality of transmission parameters further comprise a bearing angle and a cell identity details including user device location.

7. The method as claimed in claim 1, wherein the plurality of cones have a pre-determined angular separation with each other.

8. The method as claimed in claim 1, wherein the target cone identification is based on a pre-defined number of said user devices served in the plurality of cones.

9. The method as claimed in claim 1, wherein the target cone identification is based on a maximum number of user devices served in the plurality of cones.

10. The method as claimed in claim 1, wherein the type of the antenna is one of a directional type or an omni-directional type.

11. The method as claimed in claim 1, wherein the first azimuth is determined based on one of a bi-sector angle and a cone centroid of the target cone.

12. The method as claimed in claim 11, wherein the bi-sector angle of the target cone refers to an internal angle bisector dividing the angle into two equal parts.

13. The method as claimed in claim 11, wherein the cone centroid of the target cone refers to a specific point in the cone where medians intersect in the cone.

14. A network entity for determining an azimuth of an antenna serving at least one cell in a cellular network based on identification of an azimuth error, the network entity comprising:
   a transceiver configured to receive a plurality of transmission parameters from a plurality of user devices present in each cell of a cellular network; and
   a processor configured to:
     identify a target cell from at least one cell based on said transmission parameters,
     divide an angular region of a cell serving the target cell into a plurality of cones and defining an angular width of the plurality of cones based on a type of the antenna, identify a target cone from the plurality of cones based on number of said user devices being served in the plurality of cones, and determine the azimuth of the antenna, for at least once and up to two iterations, and comparing said azimuth for each iteration with a pre-defined value to identify the azimuth error for each iteration, wherein a first iteration yields a first azimuth and a second iteration yields a second azimuth, the second iteration is performed only in an event the azimuth error is identified in the first iteration, and a weight is applied, upon identification of the azimuth error in the first azimuth, to each of the plurality of cones based on a radio frequency (RF) coverage power (RSRP) and a signal to noise ratio (SNR), in order to determine a weighted centroid of the plurality of the cones.

15. The network entity as claimed in claim 14, wherein said plurality of transmission parameters comprise at least one of the RSRP, the SNR, a bearing angle, a cell identity detail, a latitude of a location of the plurality of user devices and a longitude of the location of the plurality of user devices.

16. The network entity as claimed in claim 14, wherein the processor is further configured to increase the angular width of the plurality of cones by 1 degree in an event no target cone is identified.

17. The network entity as claimed in claim 14, wherein the processor is further configured to predict an optimum value of azimuth in an event the azimuth error is identified in the first azimuth and the second azimuth by:

generating a predicted value of the RSRP and the SNR for each of the plurality of cones, determining a co-relation and a mean error between said predicted value a current value of the RSRP and SNR received from the plurality of user devices and determining a normalized value of said co-relation and the mean error, and applying a normalized weight to each of the plurality of cones and predicting said optimized value of the azimuth based on the cone having maximum normalized weight.

* * * * *